(12) United States Patent
Koch

(10) Patent No.: US 11,571,625 B2
(45) Date of Patent: *Feb. 7, 2023

(54) SYSTEMS AND METHODS FOR GATED IN-GAME ACCESS BASED ON COLLECTIONS OF UNIQUE DIGITAL ARTICLES

(71) Applicant: Mythical, Inc., Sherman Oaks, CA (US)

(72) Inventor: Rudy Koch, Sammamish, WA (US)

(73) Assignee: Mythical, Inc., Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/461,684

(22) Filed: Aug. 30, 2021

(65) Prior Publication Data

US 2022/0355206 A1 Nov. 10, 2022

Related U.S. Application Data

(63) Continuation of application No. 17/316,608, filed on May 10, 2021, now Pat. No. 11,148,058.

(51) Int. Cl.
| | |
|---|---|
| *A63F 13/69* | (2014.01) |
| *G06F 21/10* | (2013.01) |
| *A63F 13/79* | (2014.01) |
| *A63F 13/85* | (2014.01) |

(52) U.S. Cl.
CPC ............. *A63F 13/69* (2014.09); *A63F 13/79* (2014.09); *A63F 13/85* (2014.09); *G06F 21/10* (2013.01); *A63F 2300/57* (2013.01); *A63F 2300/609* (2013.01)

(58) Field of Classification Search
None
See application file for complete search history.

(56) References Cited

U.S. PATENT DOCUMENTS

| | | | |
|---|---|---|---|
| 11,229,848 B1 | 1/2022 | Koch | |
| 2012/0295699 A1* | 11/2012 | Reiche | A63F 13/79 463/31 |
| 2012/0295700 A1* | 11/2012 | Reiche | A63F 13/79 463/31 |

(Continued)

OTHER PUBLICATIONS

Ratchet & Clank (2002 video game), available at https://web.archive.org/web/20190214171859/https://en.wikipedia.org/wiki/Ratchet_%26_Clank_(2002_video_game), published at least by Feb. 14, 2019 (Year: 2019).*

*Primary Examiner* — Jay Trent Liddle
(74) *Attorney, Agent, or Firm* — Esplin & Associates, PC

(57) ABSTRACT

Systems and methods to providing gated in-game access based on collections and/or combinations of unique digital articles in an online gaming platform are disclosed. Exemplary implementations may execute instances of a game; manage player accounts associated with the players, including a first player account associated with a first player, wherein a first account inventory includes a first and a second unique digital article; receive, from the first player, a first action request for an in-game action that requires ownership of the first and second unique digital articles (as recorded on an immutable ledger); permit the first action request (and other similar requests) unless and until the first player is no longer the registered owner of the first and second unique digital articles.

20 Claims, 5 Drawing Sheets

(56) References Cited

U.S. PATENT DOCUMENTS

| | | | |
|---|---|---|---|
| 2016/0059132 A1* | 3/2016 | Reiche | A63F 13/69 |
| | | | 463/29 |
| 2018/0247191 A1 | 8/2018 | Katz | |
| 2018/0341861 A1 | 11/2018 | Katz | |
| 2018/0373983 A1 | 12/2018 | Katz | |
| 2019/0028264 A1* | 1/2019 | Bisti | H04L 9/0637 |
| 2019/0028265 A1* | 1/2019 | Bisti | A63F 13/792 |
| 2019/0282906 A1* | 9/2019 | Yong | G06Q 20/3825 |
| 2019/0314726 A1* | 10/2019 | Masini | G07F 17/32 |
| 2020/0184041 A1* | 6/2020 | Andon | A63F 13/60 |
| 2020/0360820 A1* | 11/2020 | Cunningham | G06Q 30/06 |
| 2020/0376387 A1* | 12/2020 | Packin | A63F 13/828 |
| 2021/0001235 A1* | 1/2021 | Zhang | A63F 13/35 |
| 2021/0042819 A1* | 2/2021 | Zhang | G06Q 20/389 |
| 2021/0052981 A1* | 2/2021 | Yi | A63F 13/35 |

* cited by examiner

SYSTEMS AND METHODS FOR GATED IN-GAME ACCESS BASED ON COLLECTIONS OF UNIQUE DIGITAL ARTICLES

FIELD OF THE DISCLOSURE

The present disclosure relates to systems and methods to provide gated in-game access based on collections and/or combinations of unique digital articles in an online gaming platform.

BACKGROUND

Online gaming platforms are known. Distributed ledgers are known techniques to produce a secure record or registry of ownership of articles, transactions, and other information. Many types of digital articles are known.

SUMMARY

One aspect of the present disclosure relates to a system configured to provide gated in-game access in an online gaming platform, based on collections of unique digital articles. The system may include one or more processors configured by machine-readable instructions. The system may be configured to execute instances of a game. The system may be configured to manage player accounts associated with the players, including a first player account associated with a first player, wherein a first account inventory includes a first and a second unique digital article. The system may be configured to receive, from the first player, a first action request for an in-game action that requires ownership of the first and second unique digital articles (as recorded on an immutable ledger). The system may be configured to permit the first action request (and other similar requests) unless and until the first player is no longer the registered owner of the first and second unique digital articles.

Another aspect of the present disclosure related to a method of providing gated in-game access based on collections of unique digital articles in an online gaming platform. The method may include executing instances of a game. The method may include managing player accounts associated with the players, including a first player account associated with a first player, wherein a first account inventory includes a first and a second unique digital article. The method may include receiving, from the first player, a first action request for an in-game action that requires ownership of the first and second unique digital articles (as recorded on an immutable ledger). The method may include permitting the first action request (and other similar requests) unless and until the first player is no longer the registered owner of the first and second unique digital articles.

As used herein, any association (or relation, or reflection, or indication, or correspondency, or correlation) involving servers, processors, client computing platforms, users, players, player accounts, inventories, articles, articles, requests, manners of usage, exchanges, challenges, offers, transactions, in-game actions, rights, benefits, ownership, immutable ledgers, responses, denials, contracts, metrics, metric values, scores, gains, trigger events, incentives, proposals, sets of instructions, operations, determinations, distributions, transfers, presentations, interfaces, notifications, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
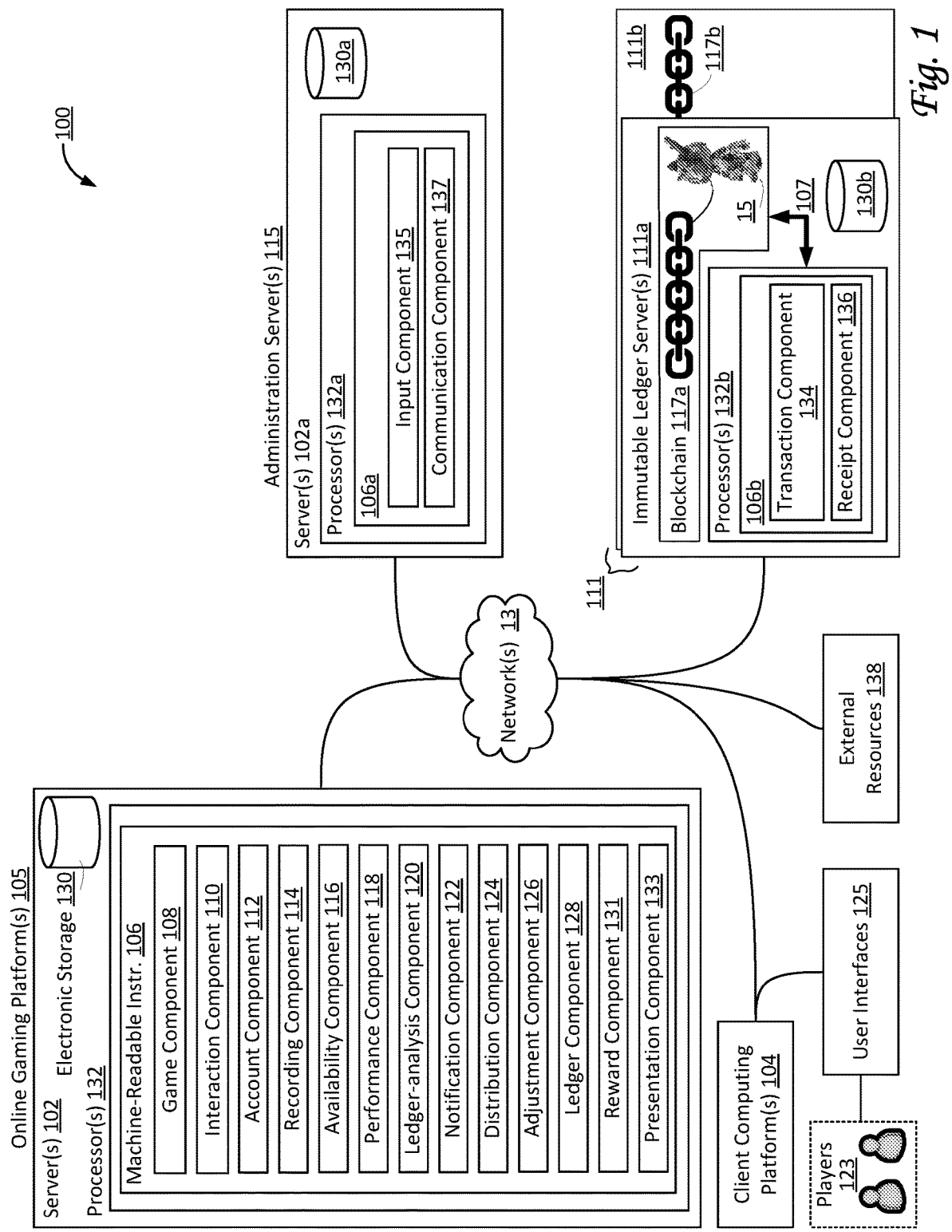
FIG. 1 illustrates a system configured to provide gated in-game access in an online gaming platform, based on collections of unique digital articles, in accordance with one or more implementations.

FIG. 1 illustrates a system 100 configured to provide gated in-game access in an online gaming platform 105, based on collections of unique digital articles, in accordance with one or more implementations. As used herein, the term "unique digital article" may refer to digital articles that are uniquely identified and/or uniquely identifiable, e.g., by an identifier or by identifying information. For example, in some implementations, an identifier or identifying information may include or be based on a combination of different types of information, including but not limited to information regarding the type of a digital article, a serial number or other numerical identifier of the digital article, and/or other types of information. As used herein, ownership of unique digital articles may be tracked, recorded, and/or otherwise registered on one or more immutable ledgers. As such, a unique digital article may be a ledger-tracked unique digital article.

Individual unique digital articles may be associated and/or correlated with another entity (which may be referred to as a "correlated entity") by virtue of technology provided and/or supported by the one or more immutable ledgers on which the ownership of the individual unique digital articles is tracked (including but not limited to smart contracts and/or other executable code on the one or more immutable ledgers). Accordingly, ownership of a unique digital article may correlate to the provision of one or more rights with respect to the correlated entity (e.g., control and/or other rights). Transactions involving a unique digital article recorded on an immutable ledger may correlate to certain transactions (or modifications) of the correlated entity, and/or vice versa.

In some implementations, correlated entities may be (or include) virtual items configured to be used within online-gaming platform 105 (such as, for example, a player-controllable in-game virtual character that is usable within an instance of a game within online gaming platform 105). Other types and/or combinations of correlated entities are envisioned within the scope of this disclosure, including but not limited to physical and/or virtual objects, items, rights, memberships, permissions, etc. The use of the singular "entity" or "correlated entity" is not intended to be limiting, as multiple different objects, items, rights, memberships, permissions, etc. may be correlated to a single unique digital article. By way of non-limiting example, a correlated entity may be an art work, a ticket to an event, a subscription to certain media content, a bundle of rights related to captured audio and/or video information, rights to distribution gains, and so forth. As used herein, the term "non-fungible token" or "NFT" may be used to refer to a combination of a particular unique digital article and a particular correlated entity that is correlated to the particular unique digital article.

System 100 may include one or more online gaming platforms 105, immutable ledger server(s) 111, administration servers 115, one or more client computing platform(s) 104, user interfaces 125, servers 102, one or more external resources 138, and/or other components. Players 123 (also referred to as users) may include one or more of a first player, a second player, a third player, a fourth player, an administrative user, and/or other players. Players 123 may include players who play and/or otherwise interact on online gaming platform 105. As used in descriptions herein, any use of the term "player" may refer to player(s) 123. Electronic storage 130a and electronic storage 130b may be similar to electronic storage 130 as described elsewhere in this disclosure, though included in administration servers 115 and immutable ledger servers 111, respectively, as depicted in FIG. 1.

Instances of games may be executed within one or more online gaming platforms 105. As used herein, online gaming platform 105 may refer to either an individual game (e.g., an interactive online game), a type of gaming console and its ecosystem, and/or both. Online gaming platform 105 may be configured to host (and/or execute instances of) the one or more (online) games. Online gaming platform 105 may be operated, hosted, and/or owned by one or more stakeholders of online gaming platform 105. For example, a platform operator (and/or another stakeholder) may sell in-game digital items (e.g., characters, weapons, resources, etc.) to players 123 of online gaming platform 105.

Referring to the game and to online gaming platform 105, in some implementations, individual players may own and/or control individual unique digital articles, correlated entities, and/or other virtual items, and exchange these with (or to) other individual players. As used herein, exchanges refer to individual players winning, losing, auctioning, selling, purchasing, trading, bartering, wagering, staking, and/or otherwise exchanging virtual items (directly, without a store or store interface under control of online gaming platform 105) to other individual players or with other individual players (including exchanging virtual items through player-to-player challenges). Due to an exchange, ownership rights of a digital article may transition from an original owner to a new owner (even if there may, in some implementations, be one or more intermediary and/or temporary owners during the process of performing the exchange). In some implementations, unique digital articles may be associated and/or correlated with other rights than ownership rights, such as, by way of non-limiting example, distribution rights.

In some implementations, distribution rights of (unique) digital articles may reflect rights held by the individual ones of the players to receive certain distributions of benefits upon exchanges involving the particular digital articles. That is, the individual players may own/hold rights to particular digital articles that guarantee them benefits upon (future) exchanges involving those digital articles regardless of whether the individual players own/hold the ownership rights for those digital articles. In some implementations, the distribution gains may result from a particular action or activity (such as, e.g., a sale of a particular digital article), e.g., within the online gaming platform 105, of a particular digital article. As used herein, a distribution gain resulting from a particular action or activity may include one or more of a portion of the proceeds of the particular action or activity, a fee related to the particular action or activity, a minimum payment triggered by the occurrence of the particular action or activity (or a set of particular actions or activities), and/or another arrangement for payment and/or compensation, including but not limited to combinations of fixed fees, minimum fees, percentages of sales, percentages of profits, and/or other arrangements. The term "portion" does not imply or require a percentage or ratio, but rather is intended to signify that beneficiaries (i.e., the players that hold the distribution rights) may receive something of value and/or use. The distribution gains may include one or more virtual currencies such as virtual tokens, virtual stars, virtual points, virtual real-world currencies (e.g., US Dollars), and/or other gains that are based on the particular digital articles.

In some implementations, unique digital articles, correlated entities, and/or other virtual items may include and/or be virtual items that are not fungible and may be usable within an online gaming platform 105. In some implementations, these may represent (three-dimensional) in-game player-controllable characters that can interact with other (in-game) virtual items within online gaming platform 105. In some implementations, virtual items may include one or more of weapons, toys, characters, abilities, skills, tools, pets, clothing, vehicles, game levels, missions, assignments, chapters, tasks, mini-games, restricted areas within a virtual space, restricted modes of gameplay, access rights within an online game, and/or other virtual items. In some implementations, virtual items may refer to any item or object within online gaming platform 105 for which a player may use, own, sell, trade, destroy, and/or otherwise effectuate a change of ownership or control (including exchanging through challenges).

As used herein, a digital article is fungible if it is functionally and/or physically indistinguishable from another digital article. For example, a payment token such as a Bitcoin is fungible. A digital article may be non-fungible if it is unique, or one-of-a-kind. For example, a specific individual CryptoKitty™ may be non-fungible. A digital article may be semi-fungible if there is a set of a limited number of similar but distinguishable digital articles. For example, a limited-edition Blanko™ or another in-game character may be semi-fungible. For example, one of a limited number of 2-dimensional or 3-dimensional in-game virtual items may be semi-fungible. For example, a digital ticket to a show, concert, exhibition, and/or other event may be semi-fungible. For example, a piece of art or jewelry (e.g., as a virtual item or as representing a physical item) may be semi-fungible. As used herein, semi-fungible digital articles are considered as unique, "not fungible", or non-fungible digital articles. In some implementations, digital articles may be usable within one or more games.

Immutable ledger server(s) 111 (e.g., immutable ledger server 111a, immutable ledger server 111b, and so forth) may be used to implement one or more immutable ledgers, including but not limited to blockchain 117a, blockchain 117b (partially visible in FIG. 1), and so forth. In some implementations, one or more immutable ledgers may be decentralized ledgers. In some implementations, blockchain 117a and blockchain 117b may be maintained by distributed computing platforms (not shown in FIG. 1). In some implementations, a distributed computing platform may be implemented by a set of client computing platforms and/or servers (including, for example, one or more immutable ledger servers 111). The distributed computing platform may support a virtual machine (not shown in FIG. 1). The distributed computing platform and/or the virtual machine may form a runtime environment for smart contracts and/or other executable code. A distributed computing platform may include electronic storage configured to store part or all of blockchain 117a. For example, the smart contracts may be stored on blockchain 117a, blockchain 117b, and/or another immutable ledger. In some implementations, the distributed computing platform may be the EOSIO platform. In some implementations, the distributed computing platform may be similar to or based on the EOSIO platform. In some implementations, the distributed computing platform may be Ethereum. In some implementations, the distributed computing platform may be similar to or based on Ethereum. In some implementations, the virtual machine may be a decentralized virtual machine.

In some implementations, at least one of the immutable ledgers implemented by immutable ledger servers 111 is a private permissioned immutable ledger. The private permissioned blockchain may be configured to record information. The recorded information may include information pertaining to unique digital articles that are associated and/or correlated with in-game player-controllable characters that are configured to be used in an instance of a game. The recorded information may include ownership of the unique digital articles. Implementing the in-game actions in the instance of the game may include, for at least some of the in-game actions implemented in the instance of the game, effectuating modifications to the recorded information pertaining to the unique digital article. For example, ownership rights and/or other rights may be modified. In some implementations, a unique digital article may be removed from one immutable ledger and added or recorded on another immutable ledger. In some implementations, at least one of the immutable ledgers implemented by immutable ledger servers 111 is a public immutable ledger. The public immutable ledger may be configured to be part of either EOSIO mainnet, Ethereum mainnet, Ethereum 1.5, Ethereum 2.0, a derivative of Ethereum 2.0 that is configured to perform transactions of Ether (ETH) between accounts, or a derivative of EOSIO that is configured to perform transactions of EOS between different accounts.

Elements of blockchain 117a or another immutable ledger may be grouped together in units that are referred to as blocks. For example, an individual block may include one or more digital articles (or digital assets) and one or more transactions. For example, an individual block may be linked to one or more other individual blocks. Individual blocks may be linked or chained together to form a structure of blocks and/or a hierarchy of blocks, such as, e.g., a chain of blocks. An individual block may include one or more digital articles, one or more transactions, and/or other information.

In some implementations, one or more immutable ledgers implemented by immutable ledger servers 111 may be publicly accessible. In some implementations, one or more immutable ledgers implemented by immutable ledger servers 111 may be private and/or permissioned. In some implementations, one or more immutable ledgers implemented by immutable ledger servers 111 may be append-only. In some implementations, existing blocks of one or more immutable ledgers implemented by immutable ledger servers 111 can substantially not be altered or deleted, unless multiple copies are altered. This is unlikely to happen provided that the multiple copies stored on different computing platforms, e.g., in different geographical locations. Immutable ledgers may be replicated on multiple computing platforms, preferably in multiple different geographical locations. Additionally, individual blocks may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, transactions, and/or articles may be digitally signed in a manner that proves integrity and/or prevents tampering, e.g., by providing authentication, as well as repudiation.

As depicted in FIG. 1, immutable ledger server 111a may include one or more of electronic storage 130b, processor(s) 132b, machine-readable instructions 106b, (node of) blockchain 117a, and/or other components. Machine-readable instructions 106b may include one or more instruction components. The instruction components may include computer program components. The instruction components may include one or more of transaction component 134, receipt component 136, and/or other instruction components. In some implementations, an individual immutable ledger server may be dedicated to a particular node of an immutable ledger. Typically, different nodes are included in (or implemented by, or hosted by) different servers or different computer systems to increase the safety and security of transactions on a blockchain. The consensus protocol used for a particular blockchain will be harder to falsify or circumvent when the different nodes are in different geographical locations, on different types of computing platforms, and/or otherwise distributed and diverse. As depicted in FIG. 1, blockchain 117a may include a unique digital article 15 (by way of non-limiting example, unique digital article 15 may be correlated with a player-controllable in-game character, as depicted, and ownership of unique digital article 15 may have been recorded on blockchain 117a, as depicted). Immutable ledger server 111b may include similar components as immutable ledger server 111a, including but not limited to blockchain 117b and/or other components.

Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Players may access system 100 via client computing platform(s) 104. In some implementations, system 100 and/or immutable ledger server(s) 111 may be configured to communicate with one or more of online gaming platform(s) 105, players 123, and/or other entities and/or components, e.g., through one or more networks 13.

Server(s) 102 may include electronic storage 130, processor(s) 132, machine-readable instructions 106, and/or other components. Server(s) 102 may be configured by machine-readable instructions 106. Machine-readable instructions 106 may include one or more instruction components. The instruction components may include computer program components. The instruction components may include one or more of a game component 108, an interaction component 110, an account component 112, a recording component 114, an availability component 116, a performance component 118, a ledger-analysis component 120, a notification component 122, a distribution component 124, an adjustment component 126, a ledger component 128, a reward component 131, a presentation component 133, a transaction component 134, a receipt component 136, an input component 135, a communication component 137, and/or other instruction components. Processor(s) 132a and processor(s) 132b may be similar to processor(s) 132 as described elsewhere in this disclosure, though included in administration servers 115 and immutable ledger servers 111, respectively, as depicted in FIG. 1. Machine-readable instructions 106a and machine-readable instructions 106b may be similar to machine-readable instructions 106 as described elsewhere in this disclosure, though included in administration servers 115 and immutable ledger servers 111, respectively, as depicted in FIG. 1.

Game component 108 is configured to execute, via online gaming platform 105, one or more instances of one or more games. An instance of a game may facilitate presentation of the game to players 123. For example, the instance of the game may be an online game executed with online gaming platform 105. Game component 108 may be configured to implement in-game actions in the instance of the game, e.g., in response to action requests for the in-game actions by the players. In some implementations, game component 108 may be arranged, organized, and/or otherwise included in online gaming platform 105. As used herein, the term "game" may refer to one or more games within online gaming platform 105. In some implementations, the game may be provided via a virtual space, and may include a plurality of resource types and/or maps.

The presentation of the game may be based on the views of the game that are determined during execution of the game, e.g., as based on instructions and/or other input from players. In some implementations, the view may be communicated (e.g., by streaming, via object/position data, and/or other information) from online gaming platform 105, immutable ledger server(s) 111, and/or other sources to client computing platforms 104 for presentation to players 123. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. In some implementations, one or more view parameters may be selectable by a player.

The instance of the game may include a simulated space that is accessible by players 123 by clients (e.g., client computing platforms 104) that present the views of the virtual space to a player. The simulated space may have a topography, express ongoing real-time interaction by one or more players 123, and/or include one or more objects positioned within the topography that are capable of locomotion and/or movement within the topography. In some implementations, the topography may be a 2-dimensional topography. In some implementations, the topography may be a 3-dimensional topography. The topography may include dimensions of the simulated space, and/or surface features of a surface or objects that are native to the simulated space. In some implementations, the topography may include a surface (e.g., a ground surface) that runs through at least a substantial section of the simulated space. In some implementations, the topography may describe a volume with one or more bodies positioned therein. The instance executed by the computer components may be synchronous, asynchronous, and/or semi-synchronous.

Within the instance of the game, players 123 may control characters, objects, simulated physical phenomena, and/or other elements within the virtual space to interact with the virtual space and/or each other. The characters may include avatars. As used herein, the term "character" or "user character" may refer to an object or group of objects present in the virtual space, that correspond(s) to an individual player. A particular user character may be controlled by the particular player with which it is associated. Such user characters may be referred to as player-controlled (or user-controlled) characters. Player-controlled element(s) may move through and interact with the virtual space (e.g., non-player characters in the virtual space, other objects in the virtual space, etc.). In some implementations, player-controlled characters may be capable of locomotion within the topography of the simulated space that is included in the instance of the game. In some implementations, the topography may include one or more restricted areas that are only accessible under certain conditions. In some implementations, player-controlled elements controlled by and/or associated with a given player may be created and/or customized by the given player. Individual players 123 or player accounts may own or control an "inventory" of virtual goods and currency (e.g., resources of the plurality of resource types) that the individual player can use (e.g., by manipulation of a user character and/or other player-controlled elements) and/or other items, to perform in-game actions within the virtual space. By way of non-limiting illustration, players 123 may include the first player and the second player that interact with online gaming platform 105. The first player and the second player may control digital articles (e.g., characters) in a game hosted by online gaming platform 105. In some implementations, account inventories may be managed (at least in part) using blockchain 117a. For example, ownership rights (and/or other types of rights) of individual virtual items included in an individual account inventory may be recorded on blockchain 117a. In some implementations, at least some individual virtual items (also referred to as correlated entities) may correlate to individual unique digital articles (that may be tracked by immutable ledger servers 111). In some implementations, individual account inventories may correspond to individual smart contracts stored on blockchain 117*a*.

Interaction component 110 may be configured to enable, facilitate, and/or implement in-game actions by players 123 in instances of games. In some implementations, interaction component 110 may be configured to operate in response to instructions and/or action requests by players 123. Interaction component 110 may be configured to receive action requests from players 123, e.g., to perform in-game actions in the instance of the game. By way of non-limiting example, in-game actions may include one or more of performing a move, a dance, a movement, or another action within the game, accessing a level or area within the game, using a particular item, weapon, or another resource within the game, participating in a particular game mode (e.g., a Battle Royale mode), join a particular mission or team, engage in a particular type of exchange and/or challenge between players, and/or other in-game actions. For example, one or more players may interact within online gaming platform 105 to build, create, gather, find, combine, and/or otherwise generate content (i.e., user-generated content). In some implementations, a player request may request access to a particular type of store or section of a store and/or marketplace within online gaming platform 105.

In some implementations, operations may be accomplished by interaction component 110 through user interfaces 125. In particular, operations pertaining to a particular player may be accomplished or controlled or initiated through a particular user interface 125 of a particular client computing platform 104, where the particular client computing platform 104 is associated with the particular player. In other words, the particular player may interact with an instance of a game through interaction component 110 and/or the particular user interface 125. In some implementations, operations by interaction component 110 may be limited, restricted, and/or otherwise controlled by other components of system 100, including but not limited to availability component 116. In some implementations, interaction component 110 may require acceptance from particular players. For example, an acceptance may accept a particular offer to partake in an activity or agreement. In some implementations, interaction component 110 may be configured to receive indications of acceptances and/or other agreements from players.

In some implementations, interaction component 110 may be configured to facilitate interaction of players 123 with system 100. In some implementations, interaction component 110 may be configured to facilitate interaction by players 123 through user interfaces 125. For example, a particular player may be associated with a particular client computing platform 104, which may include a particular user interface 125. In other words, an individual user interface may be player-specific and/or specific to a particular client computing platform. In some implementations, interaction component 110 may facilitate entry and/or selection through (presentation of) one or more user interfaces 125 (such as, by way of non-limiting example, any of the interfaces described in this disclosure).

Account component 112 is configured to manage player accounts. Player accounts may be associated with players 123. Player accounts may include and/or be associated with account inventories of virtual items. For example, the player accounts may include a first player account associated with a first player, a second player account associated with a second player, and so forth. For example, the first player account may include a first account inventory of one or more virtual items, and so forth. Individual players may control one or more virtual items in their individual account inventories. In some implementations, the first account inventory includes one or more unique digital articles (e.g., a first unique digital article, a second unique digital article, etc.). The first unique digital article may be correlated with a first in-game player-controllable character configured to be used (e.g., played with) in the instance of the game. The second unique digital article may be correlated with a second in-game player-controllable character configured to be used (e.g., played with) in the instance of the game, and so forth.

Recording component 114 is configured to record articles on immutable ledgers. In some implementations, recording component 114 may record and/or modify ownership of articles. In some implementations, recording component 114 may be configured to receive (recordation) requests to perform a recordation (e.g., of a unique digital article on an immutable ledger). For example, recording component 114 may receive, on behalf of a first player, a recordation request to record and/or modify ownership of a first unique digital article on a first immutable ledger (such as, e.g., blockchain 117*a*). In some implementations, recording component 114 may receive such requests from online gaming platform 105 and/or other components of system 100. For example, a particular request to record (ownership of) a particular unique digital article may correspond to the issuance and/or creation of that particular unique digital article. When a unique digital article or other digital article is issued and/or created, recording component 114 may record its ownership on a particular immutable ledger. In some implementations, a particular request to modify ownership of a particular unique digital article may correspond to an exchange of that particular unique digital article (e.g., between two players).

Availability component 116 may be configured to determine whether particular action requests are available to particular players. In some implementations, availability may require and/or other be based on ownership of specific unique digital articles (or types of specific unique digital articles, and/or combinations of both). For example, the specific availability of a specific action request (i.e., the in-game action requested in the specific action request) may require ownership of a particular collection and/or combination of digital articles. For example, the particular combination may include unique digital articles. In some implementations, the particular combination may include one or more of multiple unique digital articles of the same type, or issued at the same time, or issued by a particular set of smart contracts, and/or released during the same drop. In some implementations, the particular combination may include one or more of unique digital articles awarded for participating in a particular online event, or a particular real-world event. In some implementations, the particular combination may include one or more unique digital articles that have received (and/or will receive) particular distribution gains by virtue of owning particular distribution rights. In some implementations, the particular combination may include one or more unique digital articles that have been obtained through a particular type of player-to-player challenge within an instance of a game. Different collections and/or combinations of multiple unique digital articles are envisioned within the scope of this disclosure. Determinations by availability component 116 may be used to control operations by other components of system 100, including but not limited to interaction component 110.

In some implementations, availability component 116 may be configured to determine whether particular players are eligible to receive one or more participation rewards or attendance awards for either a particular unique digital article participating in an online event or attending an online event (e.g., during a particular time-limited duration, or between a begin time and an end time of the online event). Alternatively, and/or simultaneously, availability component 116 may be configured to determine whether particular players are eligible to receive one or more participation rewards or attendance awards for participating in a real-world event or attending a real-world event (e.g., during a particular time-limited duration). In some implementations, availability component 116 may be configured to determine whether particular players are eligible to receive distribution gains by virtue of owning distribution rights for one or more particular unique digital articles.

Performance component 118 may be configured to permit and/or perform requested in-game actions, e.g., to use particular unique digital articles. In some implementations, permission to use a particular unique digital article in accordance with a particular action request may be granted based on one or more determinations by availability component 116. For example, permission may be granted for certain requested in-game actions, but not for others. For example, requested in-game actions may be performed if requested by a first player, but not a second player. In some implementations, performance component 118 may permit and/or perform some types of requests, but not other types of requests. In some implementations, permission and/or performance may be prevented for certain types of requests, unless the pertinent (required) combination of unique digital articles is currently recorded on a particular immutable ledger as being owned by a particular player or account.

In some implementations, permission and/or performance by performance component 118 may require not only a particular type of request, but additionally may require the pertinent unique digital article (or other digital article that is not fungible) currently be recorded on a particular immutable ledger (or a particular type of immutable ledger). For example, a requirement for permission or performance may include recordation on a private permissioned immutable ledger. In some implementations, actions by performance component 118 may be performed responsive to particular actions or results from other components of system 100, including but not limited to availability component 116 and/or ledger-analysis component 120.

Ledger-analysis component 120 may be configured to determine whether one or more unique digital articles are recorded (on a particular immutable ledger) as being owned by a particular player and/or account. For example, ledger-analysis component 120 may determine whether a first unique digital article is currently recorded on a private permissioned immutable ledger. In some implementations, ledger-analysis component 120 may be configured to analyze recordations and other transactions on one or more immutable ledgers, e.g., by retrieving recorded information from the one or more immutable ledgers and analyzing whether any of the recorded transactions pertain to a particular unique digital article, or a set of unique digital articles. In some implementations, determinations by ledger-analysis component 120 may be performed responsive to particular actions or results from other components of system 100, including but not limited to availability component 116. In some implementations, ledger-analysis component 120 may be configured to determine whether ownership of a particular unique digital article (or other digital article that is not fungible) has ever been recorded on a public immutable ledger. For example, actions by other components of system 100, including but not limited to distribution component 124, may be responsive to determinations by ledger-analysis component 120. In some implementations, determinations by ledger-analysis component 120 may occur in real-time or near-real-time as needed for a particular action request. In some implementations, determinations by ledger-analysis component 120 may occur as needed when ownership of (unique) digital articles is modified, and results of such determinations are stored for later use by, e.g., online gaming platform 105, e.g., to be used when responding to a future action request.

Notification component 122 may be configured to notify players. For example, notification component 122 may notify players in response to action requests. In some implementations, a player may be notified responsive to a requested in-game action (as requested through an action request) not being permitted or not being performed (e.g., as determined by performance component 118). In some implementations, actions by notification component 122 may be performed responsive to particular actions, results, determinations, or decisions from other components of system 100, including but not limited to availability component 116, performance component 118, and/or ledger-analysis component 120. For example, notification component 122 may respond to a particular action request (by a particular player, and pertaining to a particular unique digital article) with a particular response such that, responsive to a particular determination, the particular response notifies the particular player that the particular player is not permitted.

Distribution component 124 may be configured to distribute and/or otherwise provide one or more of information, access to in-game content, access to game-specific communication channels, certificates, rewards, awards, prizes, distribution gains, and/or virtual items to players 123. Distributions by distribution component 124 may be adjusted, e.g., by adjustment component 126. In some implementations, distributions may be responsive to determinations by reward component 131. In some implementations, distributions may be based on and/or responsive to actions by other components of system 100, including but not limited to ledger-analysis component 120. For example, online gaming platform 105 may determine a particular player is eligible to receive one or more rewards or awards. Distribution component 124 may distribute the one or more rewards or awards in accordance with the determined eligibility. For example, a reward may be a participation reward. For example, an award may be an attendance award. For example, a certificate may be a certificate of completion or accomplishment, which may be specific to actions within the instance of the game. For example, a prize may be for effort, time, and/or resources spent, specifically in the instance of the game. For example, particular unique digital articles may be associated with distribution rights, and the particular player who owns those distribution rights may receive distribution gains in accordance with those distribution rights. For example, distribution gains may result from a particular action or activity (such as, e.g., a sale of a particular digital article), e.g., within the online gaming platform 105, involving the particular digital article.

Adjustment component 126 may be configured to adjust and/or modify distributions, including (planned or expected) distributions by distribution component 124. In some implementations, adjustment component 126 may adjust and/or modify one or more certificates, rewards, awards, prizes, distribution gains, and/or virtual items that have been determined by reward component 131 (also referred to as the determined distribution or the eligible distribution). Upon such adjustment and/or modification, this determined distribution (or eligible distribution) may be referred to as the adjusted distribution. Distribution component 124 may distribute the adjusted distribution. In some implementations, adjustments and/or modifications by adjustment component 126 may increase the value of one or more elements of the eligible distribution (this may provide a positive incentive to players). Alternatively, and/or simultaneously, adjustments and/or modifications by adjustment component 126 may decrease the value of one or more elements of the eligible distribution (this may provide a negative incentive to players). In some implementations, actions by adjustment component 126 may be performed responsive to particular actions or results from other components of system 100, including but not limited to availability component 116 and/or ledger-analysis component 120.

Ledger component 128 may be configured to generate sets of instructions for immutable ledger servers 111 (e.g., immutable ledger server 111a) and/or one or more immutable ledgers (e.g., blockchain 117a). In some implementations, ledger component 128 may be configured to transfer the generated sets of instructions to immutable ledger servers 111 and/or one or more immutable ledgers. In some implementations, one or more of these instructions may instruct the formation of a smart contract and/or the recording of the smart contract on the one or more immutable ledgers (e.g., blockchain 117a). In some implementations, one or more of these instructions may call and/or otherwise invoke a method or function of a smart contract on the one or more immutable ledgers (e.g., blockchain 117a). In some implementations, these instructions may instruct immutable ledger servers 111 to record and/or modify unique digital articles, transactions, and/or rights on one or more immutable ledgers. For example, ledger component 128 may transfer a particular set of instructions that, upon execution by blockchain 117a, issue a new unique digital article to a particular player or particular account (i.e., record the ownership of the new unique digital article as being owned by the particular player or the particular account). For example, ledger component 128 may transfer a particular set of instructions that, upon execution by blockchain 117a and blockchain 117b, remove a particular unique digital article from blockchain 117a and add the particular unique digital article to blockchain 117b.

Reward component 131 may be configured to determine eligibility for unique digital articles, other digital articles, accounts, and/or players 123 to receive one or more of information, access to in-game content, access to game-specific communication channels, certificates, rewards, awards, prizes, distribution gains, and/or virtual items. In some implementations, these types of determinations may be based on and/or responsive to actions by other components of system 100, including but not limited to ledger-analysis component 120. In some implementations, online gaming platform 105 may determine a particular player is eligible to receive one or more rewards or awards. Distributions in accordance with the determined eligibility may be made by distribution component 124. In some implementations, (one or more elements of) such eligible distributions may be adjusted and/or modified by adjustment component 126 prior to being distributed.

Presentation component 133 may be configured to present interfaces (e.g., user interfaces 125) to players, e.g., through client computing platforms 104 associated with the respective players. In some implementations, presentation component 133 may be configured to effectuate presentations of interfaces to players. The presented interfaces may include challenge interfaces, as described in this disclosure. In some implementations, presentations by presentation component 133 may be performed jointly (or at least in some cooperative manner) with one or both of game component 108 and/or interaction component 110. Presentation component 133 may present offers (from other players) to particular players, as described elsewhere in this disclosure.

Receipt component 136 may be configured to receive (sets of) instructions to add, modify, and/or remove recorded rights in blockchain 117a. For example, receipt component 136 may receive one or more sets of instructions from ledger component 128, online gaming platform 105, and/or other components of system 100. Receipt component 136 may provide received sets of instructions to record component 134 for execution. In some implementations, execution of individual ones of the instructions received may include invoking one or more function calls of an Application Programming Interface (API) 107. For example, API 107 may be configured to provide interactive communication between blockchain 117a and other components of system 100. For example, in some implementations, API function calls may be implemented as function calls to smart contracts stored on blockchain 117a. In some implementations, receipt component 136 may be arranged, organized, and/or otherwise included in immutable ledger server 111 and/or blockchain 117a.

Transaction component 134 may be configured to record (ownership) rights pertaining to digital articles, e.g., on blockchain 117a. In some implementations, transaction component 134 may record rights on electronic storage 130b. In some implementations, transaction component 134 may record rights on blockchain 117a. The rights may include ownership rights, distribution rights, and/or other rights. For example, particular recorded rights may reflect ownership of a particular digital article by a particular player or group of players. For example, a particular unique digital article may represent a three-dimensional in-game player-controllable item or character that can interact with other virtual items within online gaming platform 105. Recorded rights may be specific to a digital article (i.e., article-specific). For example, distribution rights for a particular digital article may designate rights to certain distributions of benefits upon a specifically defined in-game action (e.g., an exchange between players) involving the particular digital article.

In some implementations, transaction component 134 may be configured to record rights in blockchain 117a. In some implementations, transaction component 134 may add, modify, and/or remove recorded rights. For example, in accordance with received instructions from receipt component 136, transaction component 134 may transfer ownership of a particular digital article from a first owner to a second owner (e.g., from an original owner to a new owner, or from a loser of a challenge to a winner of the challenge) such that the recorded rights on blockchain 117a no longer reflect the ownership of the particular digital article by the first player. In some implementations, in accordance with received instructions, transaction component 134 may transfer ownership of a particular digital article temporarily, e.g., from a first owner to a temporary second owner such as a smart contract. In some case, a temporary owner may be a holding account that is merely used until ownership is transferred to either the original owner or a new owner. As used herein, the term "temporary" (and derivatives thereof) refers to a transfer or to ownership that is either known to be changed and/or modified within a predetermined period, or expected to be changed and/or modified within a predetermined period. Conversely, a non-temporary transfer from a first owner to a second owner (due to a particular exchange) can conceivably be changed and/or reverted (back from the second owner to the first owner) due to a separate and new exchange that is independent of the first particular exchange. In some implementations, in accordance with received instructions, transaction component 134 may transfer ownership of a particular digital article non-temporarily from a first owner to a second owner, e.g., when a particular exchange is not reversible or no longer reversible. In some implementations, transaction component 134 may be arranged, organized, and/or otherwise included in blockchain 117a.

In some implementations, transaction component 134 may be configured to obtain article-specific rights (e.g., ownership rights, distribution rights, and/or other rights) for particular digital articles. In some implementations, transaction component 134 may be configured to access blockchain 117a to obtain the article-specific rights (that are recorded on blockchain 117a, e.g., in one or more smart contracts).

Input component 135 may be configured to receive user input and/or player input from players and/or administrative users. For example, the user input may include entry and/or selection of particular information, unique digital articles, types of digital articles, virtual items, types of virtual items, and/or any entity or object that interacts with any part of system 100 and/or plays a part in the operation of system 100. For example, an administrative user may select a particular set of unique digital articles (e.g., all "Camo Blankos" that have been issued) as the input set of unique digital articles for other components of system 100, such as availability component 116. Additionally, in some implementations, the administrative user may select a particular adjustment to be enacted by adjustment component 126 (e.g., increase the value of one or more elements of the eligible distribution) for one or more types of determinations by reward component 131 (e.g., an eligible distribution of a reward of 100 virtual coins for leveling up a unique digital article in the selected set of unique digital articles). As another example, the administrative user may select a different set of unique digital articles (e.g., all "Boss Dino Blankos" that have been issued) as the input set of unique digital articles for other components of system 100. Additionally, the administrative user may select a particular adjustment to be enacted by adjustment component 126 (e.g., decrease the value of one or more elements of the eligible distribution) for one or more types of determinations by reward component 131 (e.g., an eligible distribution may be receiving the distribution gains based on particular in-game actions for unique digital articles in the selected set of unique digital articles).

Communication component 137 may be configured to facilitate communication and/or interaction between administration server 115 and the rest of system 100. For example, communication component 137 may communicate user input received by input component 135 to other components of system 100, particularly of online gaming platform 105.

Referring to FIG. 1, user interfaces 125 may be configured to facilitate interaction between players 123 and system 100 and/or between players 123 and client computing platforms 104. For example, user interfaces 125 may provide an interface (e.g., a challenge interface) through which players 123 may provide information to and/or receive information from system 100. In some implementations, user interface 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other user interface devices configured to receive and/or convey user input. In some implementations, one or more user interfaces 125 may be included in one or more client computing platforms 104. In some implementations, one or more user interfaces 125 may be included in system 100. In some implementations, user interface 125 may be a type of interface that facilitates the exchange of virtual items between players.

Figure 3:
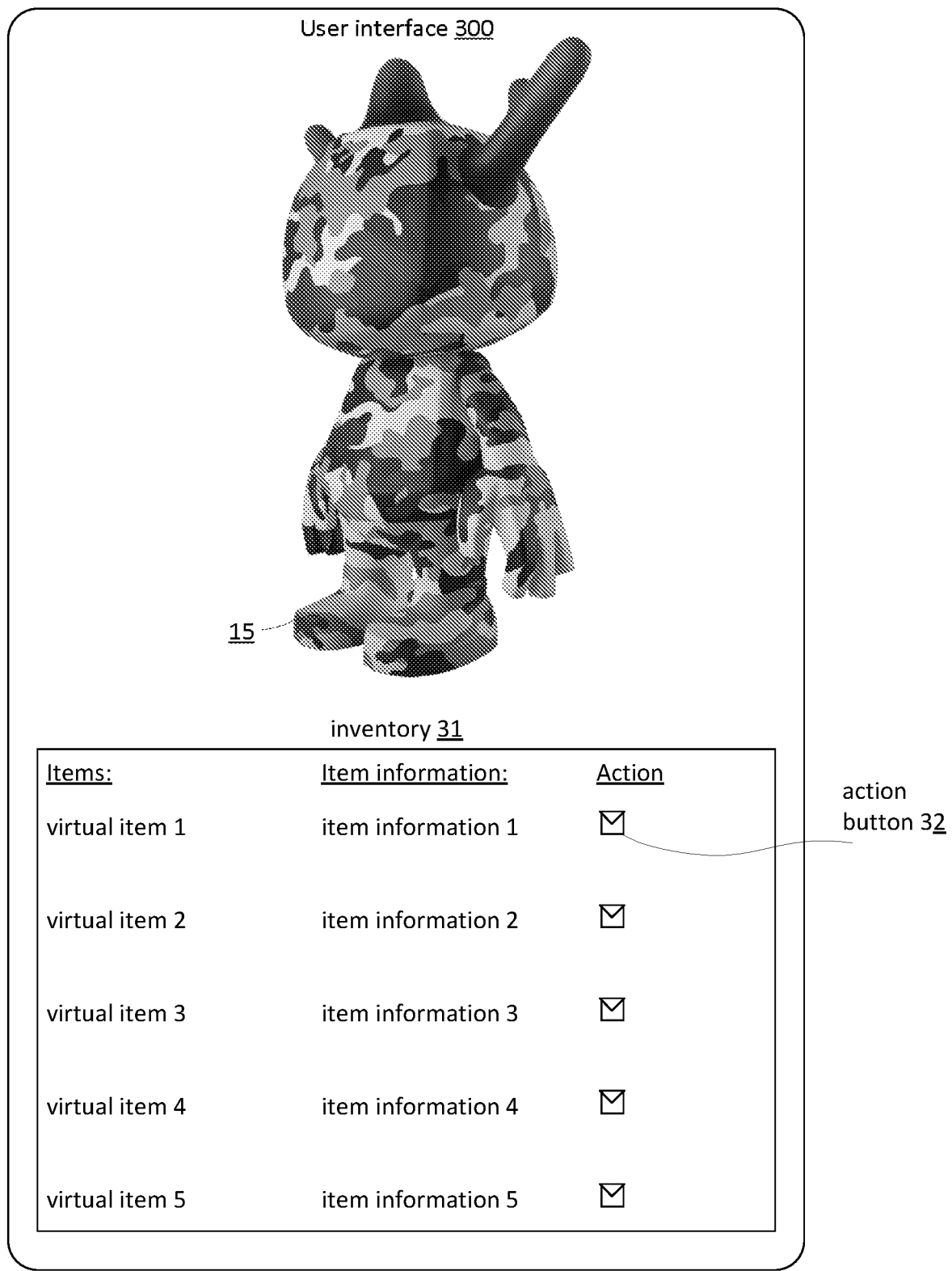
FIGS. 3-4 illustrate example implementations of user interfaces, as may be used by a system configured to provide gated in-game access in an online gaming platform, based on collections of unique digital articles, in accordance with one or more implementations.

FIG. 3 illustrates an example implementation of a user interface 300 as may be used by system 100, in accordance with one or more implementations. User interface 300 may enable a particular player to view and/or use an account inventory and/or one or more unique digital articles controlled by the particular player. User interface 300 may include a section or field for account inventory 31, and/or other graphical user interface elements. As depicted, account inventory 31 may include a list of different virtual items and/or articles currently controlled by the particular player, including virtual items 1-2-3-4-5. Account inventory 31 further depicts item information regarding these virtual items, as indicated by item information 1-2-3-4-5, which correspond to virtual items 1-2-3-4-5, respectively. Account inventory 31 as depicted may further include graphical user interface elements such as, by way of non-limiting example, an action button 32 (which initiates an action request). Upon engagement by the particular player, action request button 32 may request "virtual item 1" to be used for an in-game action the particular player can select (e.g., through a text field or a dropdown menu, as indicated by a triangle in a box). For example, the particular player may request the in-game action to launch a particular weapon (not depicted) by unique digital article 15, which may be associated with a player-controllable in-game character that is also depicted in user interface 300. Action requests for this in-game action may be permitted and subsequently performed if and only if the particular requesting player currently owns a combination of a first particular unique digital article (of a first type of unique digital articles, such as, e.g., a "Camo Blanko") and a second particular unique digital article (of a second type of unique digital articles, such as, e.g., a "Dazzle Blanko").

Figure 4:
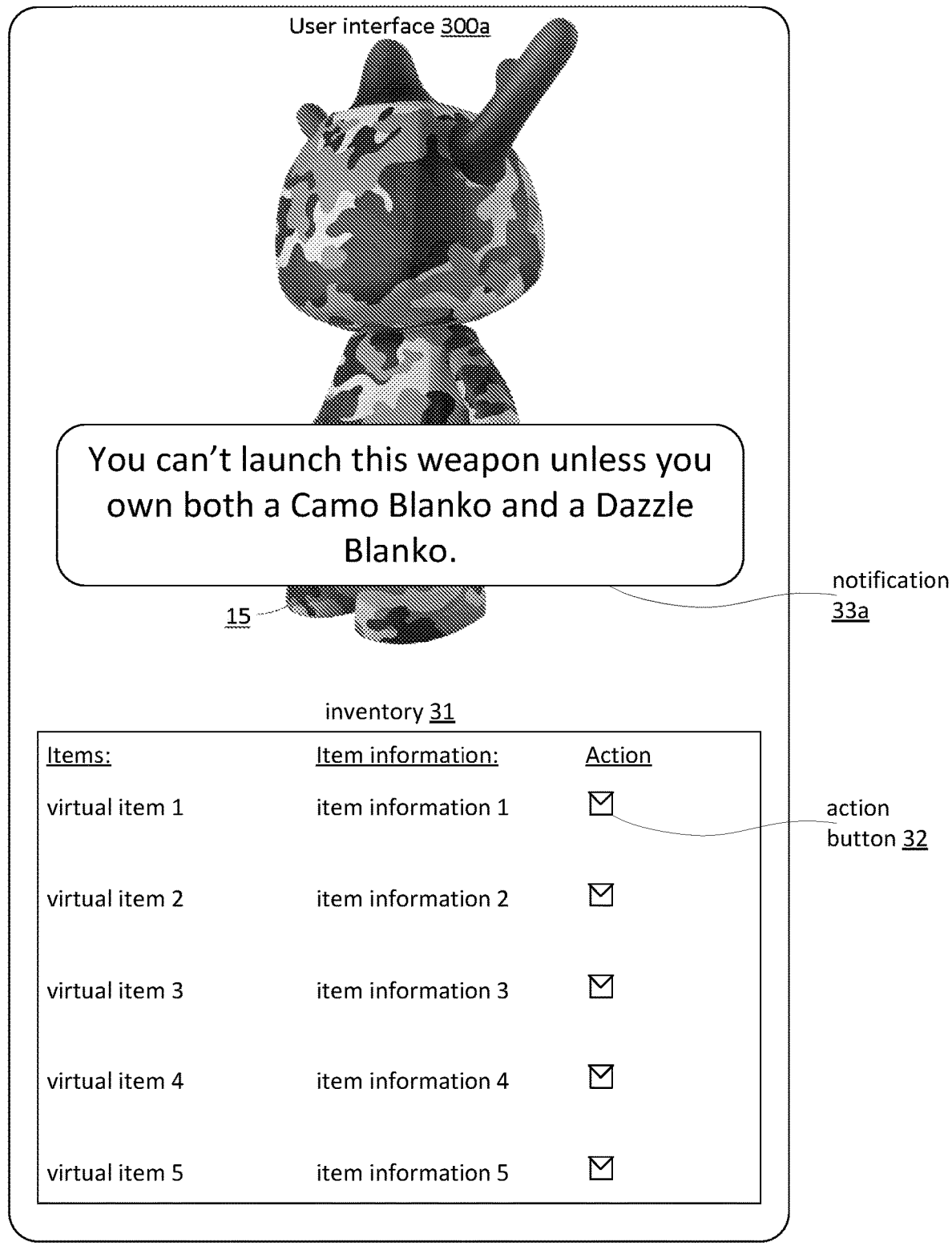

FIG. 4 illustrates an example implementation of a user interface 300a as may be used by system 100, in accordance with one or more implementations. User interface 300a is similar to user interface 300 in FIG. 3. User interface 300a in FIG. 4 may enable a particular player to view and/or use an account inventory and/or one or more unique digital articles controlled by the particular player. User interface 300a may include a section or field for account inventory 31, and/or other graphical user interface elements. As depicted, account inventory 31 may include a list of different virtual items and/or articles currently controlled by the particular player, including virtual items 1-2-3-4-5. Account inventory 31 further depicts item information regarding these virtual items, as indicated by item information 1-2-3-4-5, which correspond to virtual items 1-2-3-4-5, respectively. Account inventory 31 as depicted may further include graphical user interface elements such as, by way of non-limiting example, an action button 32. Upon engagement by the particular player, action request button 32 may request "virtual item 1" to be used for an action the particular player can select (e.g., through a text field or a dropdown menu, as indicated by a triangle in a box). User interface 300a as depicted may further include graphical user interface elements such as, by way of non-limiting example, a notification element 33a.

Upon engagement by the particular player of action request button 32, and responsive to this particular action request being denied, notification element 33a is displayed to the particular player, labeled "You can't launch this weapon unless you own both a Camo Blanko and a Dazzle Blanko." In this case, the requested in-game action is not permitted and the response to this particular action request includes displaying notification element 33a.

Figure 5A:
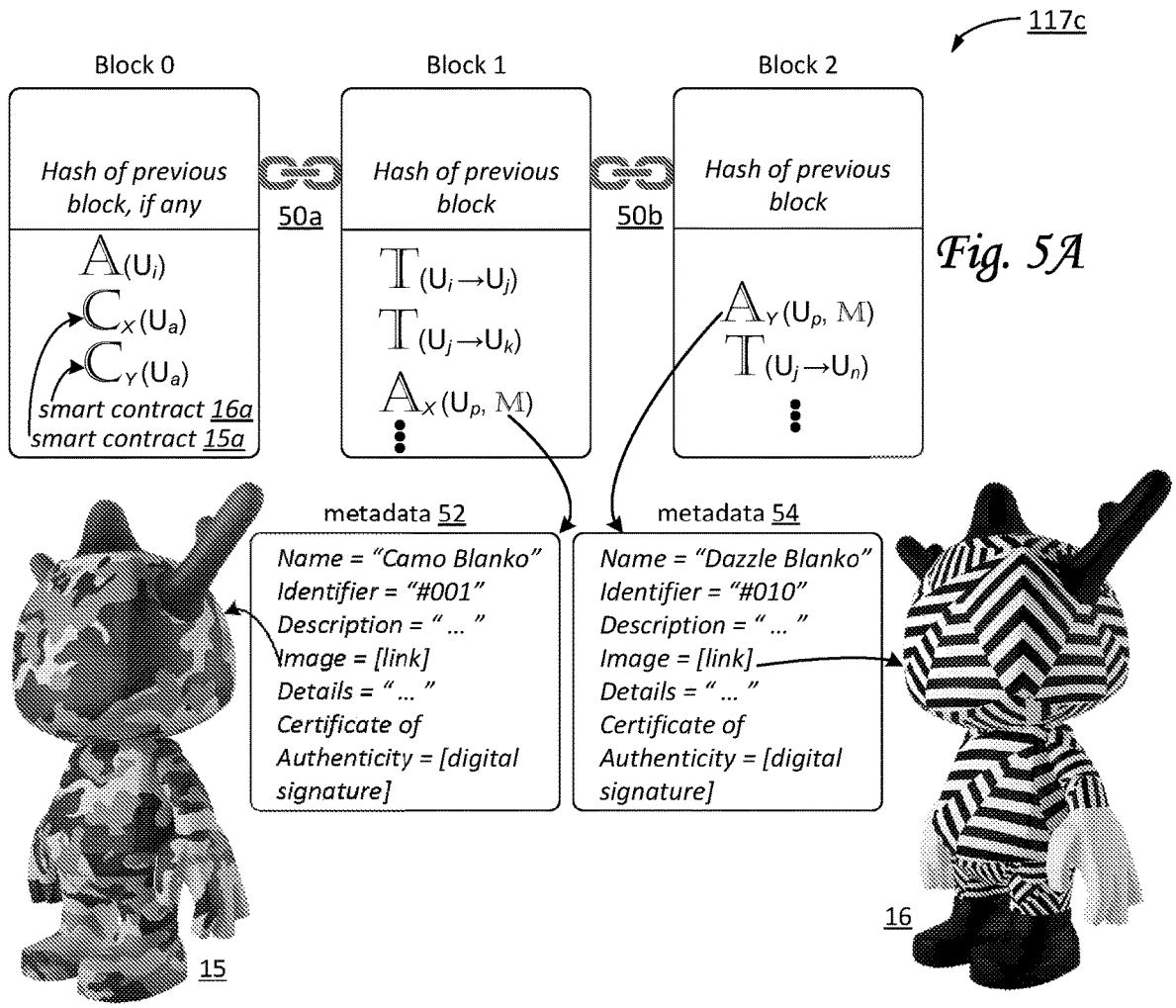
FIGS. 5A-5B illustrates exemplary blockchains, as may be used by a system configured to provide gated in-game access in an online gaming platform, based on collections of unique digital articles, in accordance with one or more implementations.

FIG. 5A illustrate exemplary blockchain 117c as may be used by system 100, in accordance with one or more implementations. FIG. 5A illustrates a blockchain 117c that includes a block 0, a block 1, and a block 2. As time progresses, more blocks may be added to blockchain 117c. The blocks within blockchain 117c are ordered. In block 0, one article (indicated by a capital "A") is generated and/or assigned to player "i" ($U_i$). A second digital article, a smart contract 15a is assigned to player "a" ($U_a$), and a third digital article, a smart contract 16a, is assigned to player "a" ($U_a$), which may be an administrative user. For example, smart contract 15a and smart contract 16a may be or include templates for issuing particular types of unique digital articles. Smart contract 15a and smart contract 16a may have been posted to blockchain 117c by a component similar to record component 134.

For example, the articles in block 0 may be individual ownership rights recorded for particular digital articles within an online gaming platform. Block 1 is connected to block 0 (as indicated by a link 50a), for example by including an address of block 1 in block 0, or vice versa. Likewise, block 1 is connected to block 2, as indicated by a link 50b. In block 1, a transaction to smart contract 15a (indicated by "Ax") is recorded. Transaction Ax to smart contract 15a may issue a unique digital article to player "p", the unique digital article being defined by metadata 52 (here, correlated to a player-controllable character named "Camo Blanko", having identifier "#001", as depicted by a linked image of unique digital article 15, as well as including various other fields of information). In block 1, another transactions from player "i" to player "j", and from player "j" to player "k" are also recorded. In block 2, several transactions may be recorded: a transaction from player "j" to player "n", and a transaction to smart contract 16a (indicated by "Ay") is recorded. Transaction Ay to smart contract 16a may issue a unique digital article to player "p", the unique digital article being defined by metadata 54 (here, correlated to a player-controllable character named "Dazzle Blanko", having identifier "#010", as depicted by a linked image of unique digital article 16, as well as including various other fields of information). In block 2, another transaction is recorded, from player "j" to player "n". Based on the combination of unique digital articles owned by player "p", a particular in-game action may be available to the player who controls the account of player "p".

Figure 5B:
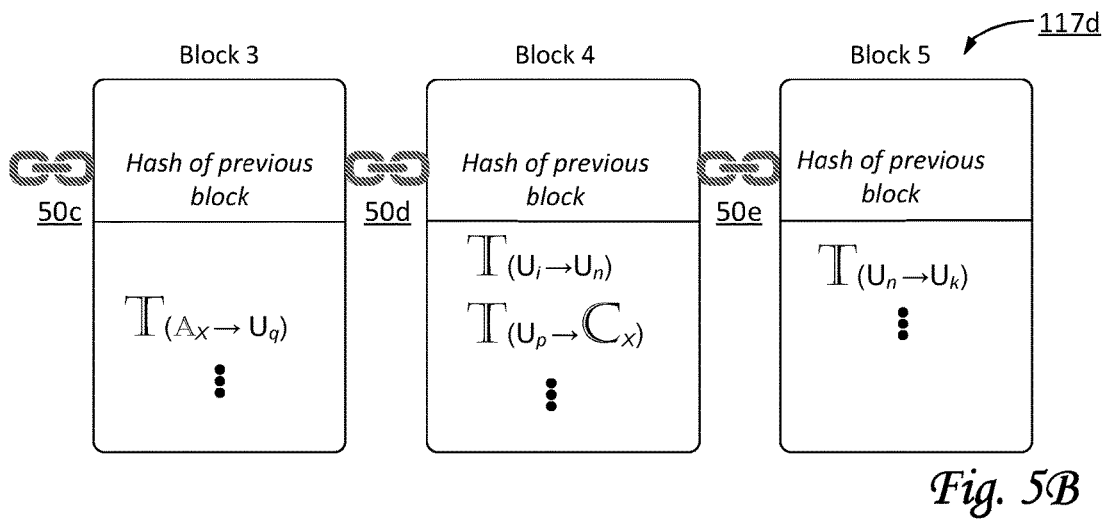

By way of non-limiting example, FIG. 5B illustrates a blockchain 117d that includes several blocks (block 3, block 4, block 5), that have been appended to blockchain 117c. Block 3 may be connected to block 2 (as indicated by link 50c), block 4 may be connected to block 3 (as indicated by a link 50d), and block 5 may be connected to block 4 (as indicated by a link 50e). In block 3, another transaction may be recorded that modifies the ownership of the unique digital article (indicated by "Ax" and defined by metadata 52) to player "q", such that player "p" no longer owns a "Camo Blanko". Block 4 includes a transaction (indicated by a capital "T") from player "i" to player "n". For example, the transaction may represent a purchase of a first virtual item by player "n" from seller player "i". Additionally, block 4 includes a transaction from player "p" to smart contract 15a. For example, this transaction may represent player "p" requesting and/or attempting to use the particular unique digital article "Ax" in some manner for an in-game action that is no longer permitted since player "p" no longer owns a combination and/or collection including both a "Camo Blanko" and a "Dazzle Blanko". Block 5 includes a transaction from player "n" to player "k".

Referring to FIG. 1, in some implementations, online gaming platforms 105, server(s) 102, client computing platform(s) 104, administration servers 115, immutable ledger servers 111, and/or external resources 138 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which online gaming platforms 105, server(s) 102, client computing platform(s) 104, administration servers 115, immutable ledger servers 111, and/or external resources 138 may be operatively linked via some other communication media.

A given client computing platform 104 may include one or more processors configured to execute computer program components. The computer program components may be configured to enable an expert or player associated with the given client computing platform 104 to interface with system 100 and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

Administration server(s) 115 may include one or more of servers 102a, processors 132a, machine-readable instructions 106a, electronic storage 130a, and/or other components. Server(s) 102a may be configured by machine-readable instructions 106a. Machine-readable instructions 106a may include one or more instruction components. The instruction components may include one or more of input component 135, communication component 137, and/or other instruction components. Administration server 115 may include communication lines, or ports to enable the exchange of information with a network and/or other computing platforms. In some implementations, administration servers 115 may be used by one or more administrative users, e.g., to configure and/or control operation of system 100. In some implementations, administrative servers 115 may include or use one or more user interfaces to receive user input and/or otherwise interact with one or more administrative users.

External resources 138 may include sources of information outside of system 100, external entities participating with system 100, external providers of computation and/or storage services, and/or other resources. In some implementations, some or all of the functionality attributed herein to external resources 138 may be provided by resources included in system 100. In some implementations, external resources 138 may include one or more blockchain oracles (as may be used by monitoring component 118 to determine results for challenges).

Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, 122, 124, 126, 128, 131, 133, 134, 135, 136, and/or 137, and/or other components. Processor(s) 132 may be configured to execute components 108, 110, 112, 114, 116, 118, 120, 122, 124, 126, 128, 131, 133, 134, 135, 136, and/or 137, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, 124, 126, 128, 131, 133, 134, 135, 136, and/or 137 are illustrated in FIG. 1 as being implemented within a single processing unit, in implementations in which processor(s) 132 includes multiple processing units, one or more of components 108, 110, 112, 114, 116, 118, 120, 122, 124, 126, 128, 131, 133, 134, 135, 136, and/or 137 may be implemented remotely from the other components. The description of the functionality provided by the different components 108, 110, 112, 114, 116, 118, 120, 122, 124, 126, 128, 131, 133, 134, 135, 136, and/or 137 described below is for illustrative purposes, and is not intended to be limiting, as any of components 108, 110, 112, 114, 116, 118, 120, 122, 124, 126, 128, 131, 133, 134, 135, 136, and/or 137 may provide more or less functionality than is described. For example, one or more of components 108, 110, 112, 114, 116, 118, 120, 122, 124, 126, 128, 131, 133, 134, 135, 136, and/or 137 may be eliminated, and some or all of its functionality may be provided by other ones of components 108, 110, 112, 114, 116, 118, 120, 122, 124, 126, 128, 131, 133, 134, 135, 136, and/or 137. As another example, processor(s) 132 may be configured to execute one or more additional components that may perform some or all of the functionality attributed below to one of components 108, 110, 112, 114, 116, 118, 120, 122, 124, 126, 128, 131, 133, 134, 135, 136, and/or 137.

Figure 2:
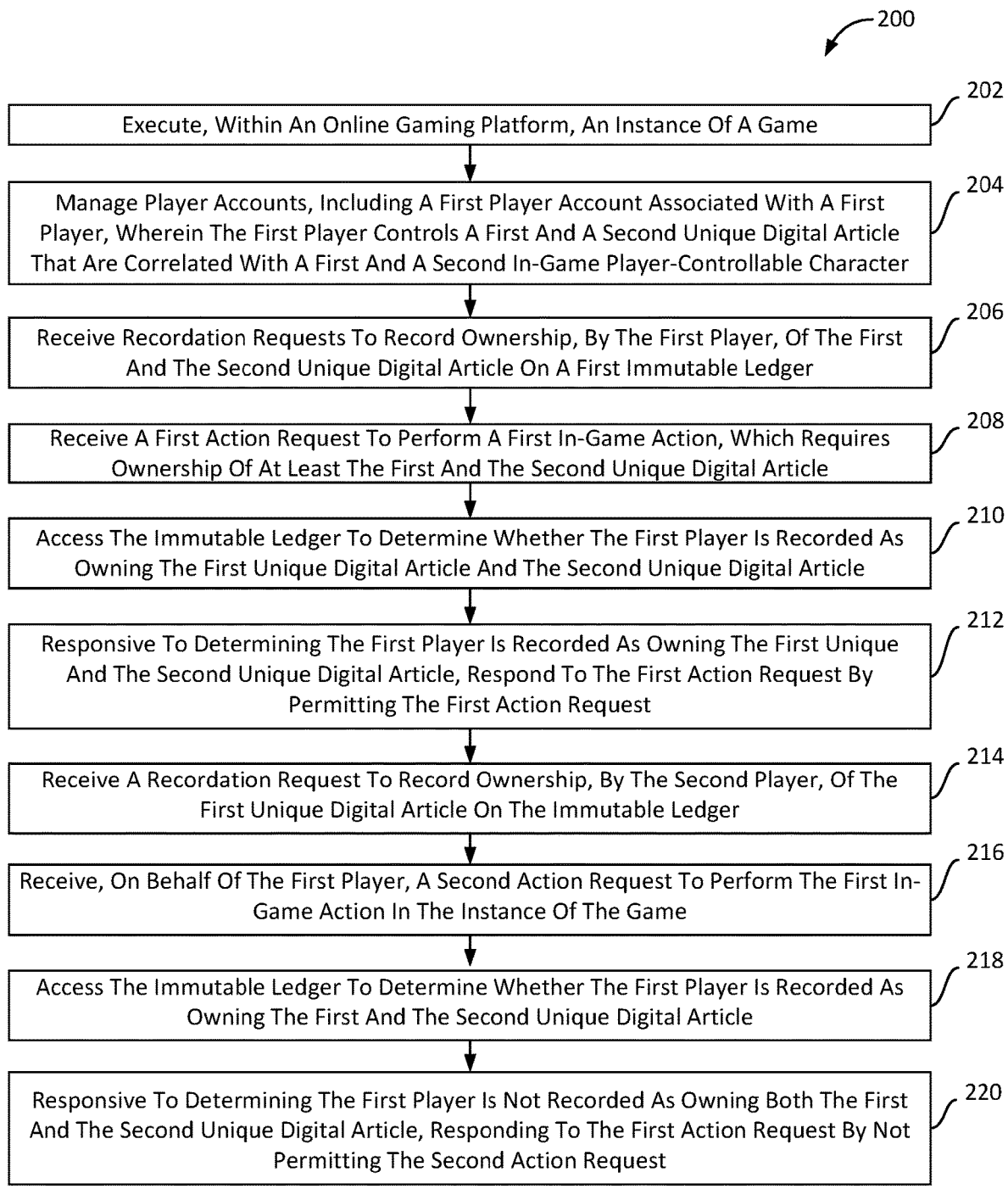
FIG. 2 illustrates a method for providing gated in-game access in an online gaming platform, based on collections of unique digital articles, in accordance with one or more implementations.

FIG. 2 illustrates a method 200 to of providing gated in-game access based on collections of unique digital articles in an online gaming platform, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an instance of a game is executed, within the online gaming platform, to facilitate presentation of the game to players, and in-game actions are implemented in the instance of the game in response to action requests for the in-game actions by the players. Presentation of the game is based on views of the game that are determined during execution of the instance of the game. The players include a first player and a second player. In some embodiments, operation 202 is performed by a game component and/or an interaction component the same as or similar to game component 108 and/or interaction component 110 (shown in FIG. 1 and described herein).

At an operation 204, player accounts are managed that are associated with the players. The player accounts include account inventories of virtual items. The player accounts include a first player account associated with the first player. The first player account includes a first account inventory of one or more virtual items. The first player controls the one or more virtual items in the first account inventory. The first account inventory includes a first unique digital article that is correlated with a first in-game player-controllable character configured to be used in the instance of the game and a second unique digital article that is correlated with a second in-game player-controllable character configured to be used in the instance of the game. In some embodiments, operation 204 is performed by an account component the same as or similar to account component 112 (shown in FIG. 1 and described herein).

At an operation 206, one or more first recordation requests are received to record ownership, by the first player, of the first unique digital article and the second unique digital article on a first immutable ledger. In some embodiments, operation 206 is performed by a recording component the same as or similar to recording component 114 (shown in FIG. 1 and described herein).

At an operation 208, a first action request is received, on behalf of the first player, to perform a first in-game action in the instance of the game. Availability of the first in-game action requires ownership of at least the first unique digital article and the second unique digital article. In some embodiments, operation 208 is performed by an interaction component and/or an availability component the same as or similar to interaction component 110 and/or availability component 116 (shown in FIG. 1 and described herein).

At an operation 210, the immutable ledger is accessed to determine whether the first player is recorded as owning the first unique digital article and the second unique digital article. In some embodiments, operation 210 is performed by a ledger-analysis component the same as or similar to ledger-analysis component 120 (shown in FIG. 1 and described herein).

At an operation 212, responsive to determining the first player is recorded as owning the first unique digital article and the second unique digital article, the first action request is responded to by permitting either (i) the first player to perform the first in-game action in the instance of the game, or (ii) performing the first in-game action in the instance of the game in accordance with the first action request. In some embodiments, operation 212 is performed by an interaction component and/or a performance component the same as or similar to interaction component 110 and/or performance component 118 (shown in FIG. 1 and described herein).

At an operation 214, a recordation request is received to record ownership, by the second player, of the first unique digital article on the immutable ledger. In some embodiments, operation 214 is performed by a recording component the same as or similar to recording component 114 (shown in FIG. 1 and described herein).

At an operation 216, a second action request is received, on behalf of the first player, to perform the first in-game action in the instance of the game. Availability of the first in-game action requires ownership of the first unique digital article and the second unique digital article. In some embodiments, operation 216 is performed by an interaction component and/or an availability component the same as or similar to interaction component 110 and/or availability component 116 (shown in FIG. 1 and described herein).

At an operation 218, the immutable ledger is accessed to determine whether the first player is recorded as owning the first unique digital article and the second unique digital article. In some embodiments, operation 218 is performed by a ledger-analysis component the same as or similar to ledger-analysis component 120 (shown in FIG. 1 and described herein).

At an operation 220, responsive to determining the first player is not recorded as owning both the first unique digital article and the second unique digital article, responding to the second action request by either (i) denying the first player to perform the first in-game action in the instance of the game, or (ii) transferring a response to the first player. The response notifies the first player that the first player is not permitted to perform the first in-game action in the instance of the game as requested in the second action request. In some embodiments, operation 220 is performed by an interaction component, a notification component, and/or a performance component the same as or similar to interaction component 110, notification component 122, and/or performance component 118 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. It is to be understood that the present technology contemplates that, to the extent possible, one or more features of any implementation can be combined with features of any other implementation.

What is claimed is:

1. A system configured to provide gated in-game access in an online gaming platform, based on collections of unique digital articles, the system comprising:
   one or more processors configured by machine-readable instructions to:
   execute, within the online gaming platform, an instance of a game to facilitate presentation of the game to users, and implement in-game actions in the instance of the game in response to action requests for the in-game actions by the users, wherein the presentation of the game is based on views of the game that are determined during execution of the instance of the game, wherein the users include a first user and a second user;
   manage user accounts associated with the users, wherein the user accounts include account inventories of virtual items, wherein the user accounts include a first user account associated with the first user, wherein the first user account includes a first account inventory of one or more virtual items, wherein the first user controls the one or more virtual items in the first account inventory, wherein the first account inventory includes a first unique digital article that is correlated with a first in-game user-controllable character and a second unique digital article that is correlated with a second in-game user-controllable character;
   receive one or more recordation requests to record ownership, by the first user, of the first unique digital article and the second unique digital article on a ledger, wherein the ledger is an append-only ledger;
   receive, on behalf of the first user, a first action request to perform a first in-game action in the instance of the game, wherein performance of the first in-game action requires ownership of a required combination of unique digital articles, wherein the required combination includes at least the first unique digital article and the second unique digital article;
   access the ledger to determine whether the first user is recorded as owning the required combination of unique digital articles;
   responsive to determining the first user is recorded as owning the required combination of unique digital articles, respond to the first action request by permitting either (i) the first user to perform the first in-game action in the instance of the game, or (ii) performing the first in-game action in the instance of the game in accordance with the first action request;

receive a recordation request to record ownership, by the second user, of the first unique digital article on the ledger;

receive, on behalf of the first user, a second action request to perform the first in-game action in the instance of the game; and responsive to the first user not being recorded as owning the required combination of unique digital articles, respond to the second action request by either (i) denying the first user to perform the first in-game action in the instance of the game, or (ii) transferring a response to the first user, wherein the response notifies the first user that the first user is not permitted to perform the first in-game action in the instance of the game as requested in the second action request.

2. The system of claim 1, further comprising:

a ledger server comprising one or more processors configured by machine-readable instructions to:

receive and execute sets of instructions to record or modify ownership rights pertaining to digital articles on the ledger, wherein the digital articles include the first unique digital article and the second unique digital article;

wherein receiving the one or more recordation requests include generating and transferring one or more instructions to the ledger server for execution, and wherein the ledger server is configured to receive and execute the one or more instructions.

3. The system of claim 1, wherein the first unique digital article is correlated with the first in-game user-controllable character that is configured to be controlled by the first user in the instance of the game, and wherein the first action request is to perform the first in-game action in the instance of the game using the first in-game user-controllable character.

4. The system of claim 3, wherein the first in-game action includes entering a restricted area in the instance of the game.

5. The system of claim 1, wherein the required combination of unique digital articles includes at least one unique digital article of a first type of unique digital articles and at least another unique digital article of a second type of unique digital articles, wherein the first unique digital article is of the first type of unique digital articles, and wherein the second unique digital article is of the second type of unique digital articles.

6. The system of claim 5, wherein the first type of unique digital articles includes a set of unique digital articles that are issued by a particular set of one or more smart contracts.

7. The system of claim 5, wherein the second type of unique digital articles includes a set of unique digital articles that were issued during a particular release.

8. The system of claim 1, wherein the ledger is a blockchain.

9. The system of claim 5, wherein the performance of the first in-game action further requires ownership of a third unique digital article, wherein the third type of unique digital articles includes a set of unique digital articles that have received one or more participation rewards for:

(i) participating in an online event during a particular time-limited duration, or (ii) participating in a real-world event during the particular time-limited duration, or (iii) both (i) and (ii).

10. The system of claim 5, wherein the required combination of unique digital articles further includes a third unique digital article, wherein the third type of unique digital articles unique digital article includes a set of unique digital articles that have received particular distribution gains by virtue of owning particular distribution rights.

11. A method of providing gated in-game access based on collections of unique digital articles in an online gaming platform, the method comprising:

executing, within the online gaming platform, an instance of a game to facilitate presentation of the game to users, and implementing in-game actions in the instance of the game in response to action requests for the in-game actions by the users, wherein the presentation of the game is based on views of the game that are determined during execution of the instance of the game, wherein the users include a first user and a second user;

managing user accounts associated with the users, wherein the user accounts include account inventories of virtual items, wherein the user accounts include a first user account associated with the first user, wherein the first user account includes a first account inventory of one or more virtual items, wherein the first user controls the one or more virtual items in the first account inventory, wherein the first account inventory includes a first unique digital article that is correlated with a first in-game user-controllable character and a second unique digital article that is correlated with a second in-game user-controllable character;

receiving one or more first recordation requests to record ownership, by the first user, of the first unique digital article and the second unique digital article on a first ledger, wherein the ledger is an append-only ledger;

receiving, on behalf of the first user, a first action request to perform a first in-game action in the instance of the game, wherein performance of the first in-game action requires ownership of a required combination of unique digital articles, wherein the required combination includes at least the first unique digital article and the second unique digital article;

accessing the ledger to determine whether the first user is recorded as owning the required combination of unique digital articles;

responsive to determining the first user is recorded as owning the first unique digital article and the second unique digital article, responding to the first action request by permitting either (i) the first user to perform the first in-game action in the instance of the game, or (ii) performing the first in-game action in the instance of the game in accordance with the first action request;

receiving a recordation request to record ownership, by the second user, of the first unique digital article on the ledger;

receiving, on behalf of the first user, a second action request to perform the first in-game action in the instance of the game; and responsive to the first user not being recorded as owning the required combination of unique digital articles, responding to the second action request by either (i) denying the first user to perform the first in-game action in the instance of the game, or (ii) transferring a response to the first user, wherein the response notifies the first user that the first user is not permitted to perform the first in-game action in the instance of the game as requested in the second action request.

12. The method of claim 11, wherein receiving the one or more recordation requests includes generating and transferring one or more instructions to a ledger server for execution, the method further comprising:

receiving and executing the one or more instructions.

13. The method of claim 11, wherein the first unique digital article is correlated with the first in-game user-controllable character that is controlled by the first user in the instance of the game, and wherein the first action request is to perform the first in-game action in the instance of the game using the first in-game user-controllable character.

14. The method of claim 13, wherein the first in-game action includes entering a restricted area in the instance of the game.

15. The method of claim 11, wherein the required combination of unique digital articles includes at least one unique digital article of a first type of unique digital articles and at least another unique digital article of a second type of unique digital articles, wherein the first unique digital article is of the first type of unique digital articles, and wherein the second unique digital article is of the second type of unique digital articles.

16. The method of claim 15, wherein the first type of unique digital articles includes a set of unique digital articles that are issued by a particular set of one or more smart contracts.

17. The method of claim 15, wherein the second type of unique digital articles includes a set of unique digital articles that were issued during a particular release.

18. The method of claim 11, wherein the ledger is a blockchain.

19. The method of claim 15, wherein the performance of the first in-game action further requires ownership of a third unique digital article, wherein the third type of unique digital article includes a set of unique digital articles that have received one or more participation rewards for:

(i) participating in an online event during a particular time-limited duration, or (ii) participating in a real-world event during the particular time-limited duration, or (iii) both (i) and (ii).

20. The method of claim 15, wherein the required combination of unique digital articles further includes a third unique digital article, wherein the third type of unique digital article includes a set of unique digital articles that have received particular distribution gains by virtue of owning particular distribution rights.

* * * * *